United States Patent [19]

Suzuki et al.

[11] 4,156,363
[45] May 29, 1979

[54] MAGNETIC FLOWMETER

[75] Inventors: Kazuie Suzuki, Tokyo; Chuji Akiyama, Kawasaki, both of Japan

[73] Assignee: Hokushin Electric Works, Ltd., Tokyo, Japan

[21] Appl. No.: 902,494

[22] Filed: May 3, 1978

[51] Int. Cl.² ............................................. G01F 1/58
[52] U.S. Cl. ............................................. 73/194 EM
[58] Field of Search ................................. 73/194 EM

[56] References Cited

U.S. PATENT DOCUMENTS

| | | | |
|---|---|---|---|
| 3,996,797 | 12/1976 | Torimaru et al. | 73/194 EM |
| 4,059,014 | 11/1977 | Torimaru | 73/194 EM |

*Primary Examiner*—Charles A. Ruehl
*Attorney, Agent, or Firm*—Michael Ebert

[57] ABSTRACT

An excitation system for a magnetic flowmeter provided with a flow tube through which the fluid to be metered is conducted, the tube having a pair of electrodes mounted at diametrically-opposed positions thereon and including an excitation coil to establish a magnetic field in the tube which is normal to the tube's axis and to a transverse axis passing through the electrodes, the fluid intersecting the magnetic field to induce a flow rate signal in said electrodes, the system including a full-wave rectifier coupled to a commercial power line source which produces sinusoidal a-c power whose wave periodically crosses a zero line. A switch is interposed between the rectifier and said excitation coil. Also provided are means to effect on-off control of the switch by high-frequency pulses which are in synchronism with the commercial power line frequency but are not generated in the region in which said a-c power crosses the zero line, whereby the full-wave rectified output is periodically fed to the excitation coil except in the interval when the a-c power crosses the zero line.

7 Claims, 15 Drawing Figures

4,156,363

MAGNETIC FLOWMETER

BACKGROUND OF INVENTION

This invention relates generally to magnetic flowmeters, and more particularly to an excitation circuit for a magnetic flowmeter whose electromagnet is excited by a low-frequency excitation current.

In a magnetic flowmeter, an electromagnetic field is established therein by an electromagnet having an excitation coil, the field being intercepted by a fluid passing through the flow tube to induce a flow rate signal in a pair of diametrically-opposed electrodes. Magnetic flowmeters are known which make use of a low-frequency excitation current, such as one whose excitation frequency is well below that of the commercial powerline frequency. One can, by means of a low-frequency excitation type magnetic flowmeter, obtain a flow rate signal having an excellent signal-to-noise ratio; for unwanted magnetic coupling and/or electrostatic coupling between the excitation coil and the signal lead wires connected to the flow tube electrodes may be reduced considerably.

In order to eliminate unwanted fluctuations from the flow rate signal yielded by a low-frequency excitation type magnetic flowmeter, which result from fluctuations in the excitation current for the electromagnet, the general practice is to provide a reference voltage-detecting circuit. This circuit is arranged to produce a reference voltage proportional to the excitation current, the ratio of this reference voltage to the flow rate signal being determined by means of a converter or divider.

In the copending application of Kazuie Suzuki, entitled "Magnetic Flowmeter," Ser. No. 888,631, filed Mar. 21, 1978, there is disclosed a reference voltage-detecting circuit which makes use of a current transformer interposed between the excitation current source and the excitation coil, the arrangement being such as to produce a reference voltage having a waveform identical to that of the excitation current without distortion despite saturation of the transformer core.

In this prior arrangement, the current transformer for detecting the reference voltage is interposed between the excitation coil of the magnetic flowmeter and the excitation current source. The primary of the transformer is constituted by a pair of primary windings in an arrangement wherein the excitation current is caused to flow in one direction in the first primary winding and a current produced by the counter electromotive force induced in the excitation coil in every on-off transient of the excitation current is caused to flow in the opposite direction in the second primary winding. A reference voltage a-c signal changing in both positive and negative directions is obtained from a secondary winding of the transformer. By "full-wave" rectifying this reference voltage a-c signal, a reference voltage which has a waveform similar to that of the excitation current is obtained. This reference voltage as well as the signal obtained from the flowmeter is applied to a divider which yields an output signal proportional to flow rate, the signal being substantially independent of fluctuations in the excitation current. However, this prior arrangement is subject to errors in the reference voltage signal which results from the temporary decrease in its level in the region where the a-c electric power crosses the zero line.

SUMMARY OF INVENTION

In view of the foregoing, the main object of this invention is to provide a magnetic flowmeter which obviates errors in the reference voltage signal resulting from the temporary decrease in its level in the region where the a-c electric power crosses the zero line.

Briefly stated, in a magnetic flowmeter whose electromagnet is excited by a low-frequency or direct current, the excitation current is produced by chopping the output of a rectifying bridge functioning to rectify a-c power supplied from a commercial power source. This chopping action is effected by means of a switching element which is on-off controlled by output pulses from a switch drive circuit, these output pulses being produced in synchronism with the frequency of the commercial power line except in the intervals when the commercial electric power is in the region in which the commercial power voltage crosses the zero line.

For a better understanding of the invention as well as other objects and further features thereof, reference is made to the following detailed description to be read in conjunction with the accompanying drawings, wherein:

FIG. 1 is a schematic diagram of a prior type of magnetic flowmeter serving to illustrate the principle underlying the invention;

FIGS. 2A to G are waveforms illustrating the operation of the magnetic flowmeter shown in FIG. 1;

DESCRIPTION OF INVENTION

Prior Arrangement

Figure 1:
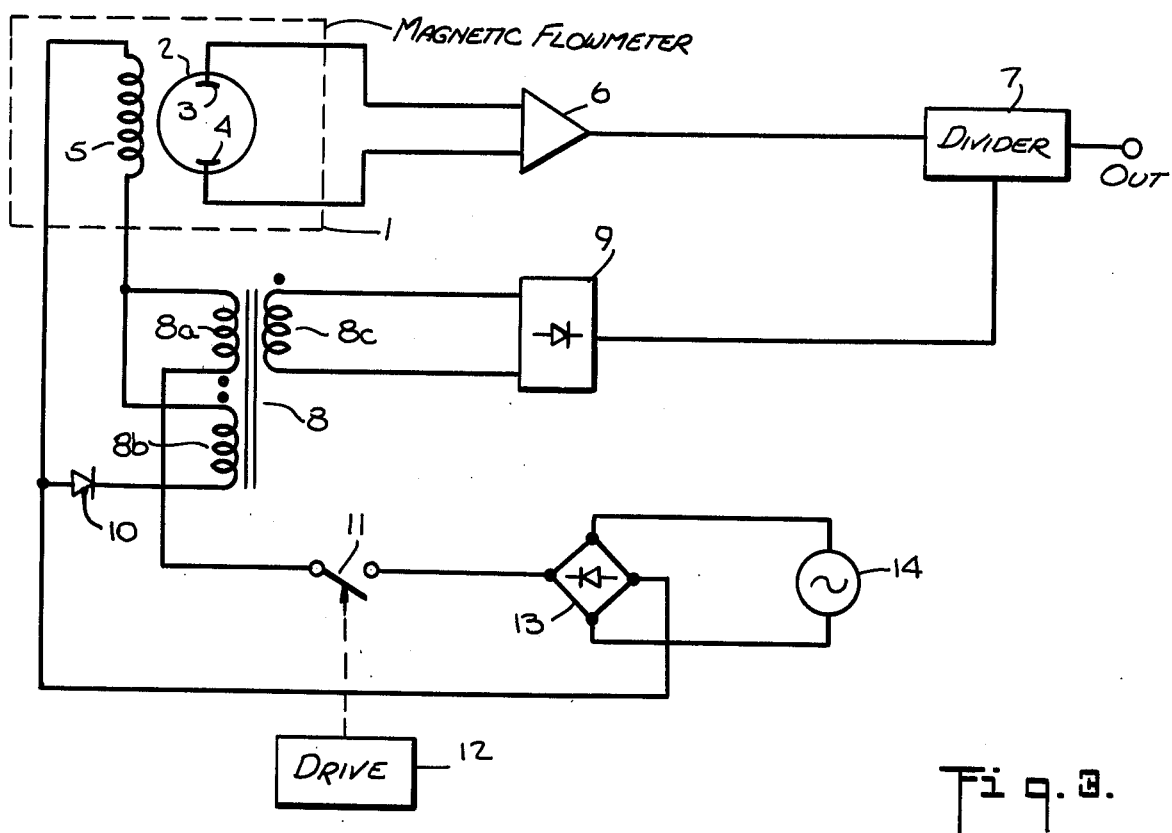

FIG. 1 is a schematic diagram of a magnetic flowmeter composed of a flow tube 2 through which liquid to be metered is conducted, a pair of electrodes 3 and 4 mounted at diametrically-opposed positions on tube 2, and an excitation coil 5 serving to generate a magnetic field normal to the tube's axis and a transverse axis passing through electrodes 3 and 4.

When the fluid intersects this magnetic field, a voltage proportional to the volumetric flow rate is induced in the fluid and the resultant flow signal yielded by the electrodes is amplified by an amplifier 6. A divider 7 is arranged to receive the output of amplifier 6 as well as a reference voltage signal derived by a rectifier 9 from a current transformer 8 whose primary is interposed in the excitation current circuit for excitation coil 5.

The primary of current transformer 8 is constituted by a first primary winding 8a connected in series with the excitation current circuit, and a second primary winding 8b which forms a series circuit with a diode 10, this series circuit being connected across the excitation current circuit. The reference-voltage is derived from the secondary winding 8c of current transformer 8.

A switching element 11 is interposed between the first primary winding 8a and the output junctions of a full-wave rectifier 13 whose input junctions are connected to a commercial power line source 14. Switch 11 is on-off controlled by high-frequency pulses supplied by a switch drive circuit 12, whose frequency rate is higher than that of the commercial power line.

With this arrangement, the a-c voltage supplied by commercial power line source 14 is full-wave rectified by rectifier 13, switch 11 acting to chop the full-wave rectified output in accordance with high-frequency pulses supplied by switch drive circuit 12, whereby on-off excitation current whose on-off rate is greater than the commercial power line frequency is applied to excitation coil 5. Since the current is applied to the excitation coil through the first primary winding 8a of current transformer 8, a voltage corresponding to this current is picked up by secondary winding 8c. When switch 11 is in the "off" state, a counter electromotive force is generated in excitation coil 5, and the resultant current flows in a circuit constituted by coil 5, diode 10 and winding 8b. The voltage signal proportional to this current is derived from secondary winding 8c.

As a consequence of the current supplied by full-wave rectifier 13 when switch 11 is in its "on" state and the current resulting from the counter electromotive force which flows in the excitation coil, a continuous d-c excitation current is obtained therein.

In current transformer 8, primary windings 8a and 8b are so arranged that the currents flow in opposite directions therein when switch 11 is on-off controlled, thereby causing secondary winding 8c to yield an a-c reference signal having the same frequency as that of the on-off rate of switch 11, the amplitude of the reference signal being proportional to the excitation current.

On the other hand, the flow rate signal which is induced in electrodes 3 and 4, after being amplified by amplifier 6, is applied to divider 7, whereby the flow rate signal is divided by the output of rectifier 9. In this way, one obtains a flow rate signal free of the unwanted influence of fluctuations in the excitation current.

With this prior arrangement, a low-frequency rectangular excitation wave may be produced if the switching operation of switch 11 is periodically interrupted at a low frequency rate. In a low-frequency excitation type magnetic flowmeter, the flow signal during the period in which the coil is in its excitation state are sampled separately at a time when the excitation current is substantially stabilized. Then the flow signal in the non-excitation state is subtracted from the flow signal in the excitation state, thereby obviating the d-c noise component included in the flow signal. However, since the means for this purpose, which is incorporated in divider 7, need not be understood in order to explain the salient feature of the present invention, a detailed explanation of these means is omitted in the following description.

The above-described magnetic flowmeter has several notable features.

(1) Since the frequency of the current flowing in current transformer 8 is relatively high (i.e., 50 or 60 Hz), while the frequency of the excitation current is low, accurate signal detection can be effected by means of a small size current transformer.

(2) Since isolation between the commercial power line source and the reference-voltage signal is effected by the current transformer, the power transformer usually necessary for this purpose in a conventional apparatus may be omitted, thereby reducing the overall bulk of the apparatus.

(3) Since a high level reference voltage can be obtained, it becomes possible to omit the amplifier which is necessary in a conventional configuration.

However, in this magnetic flowmeter, if one seeks to detect a reference-voltage signal proportional to the excitation current, a certain drawback is encountered. This drawback will now be explained in connection with FIGS. 2A to 2G.

Figure 2:
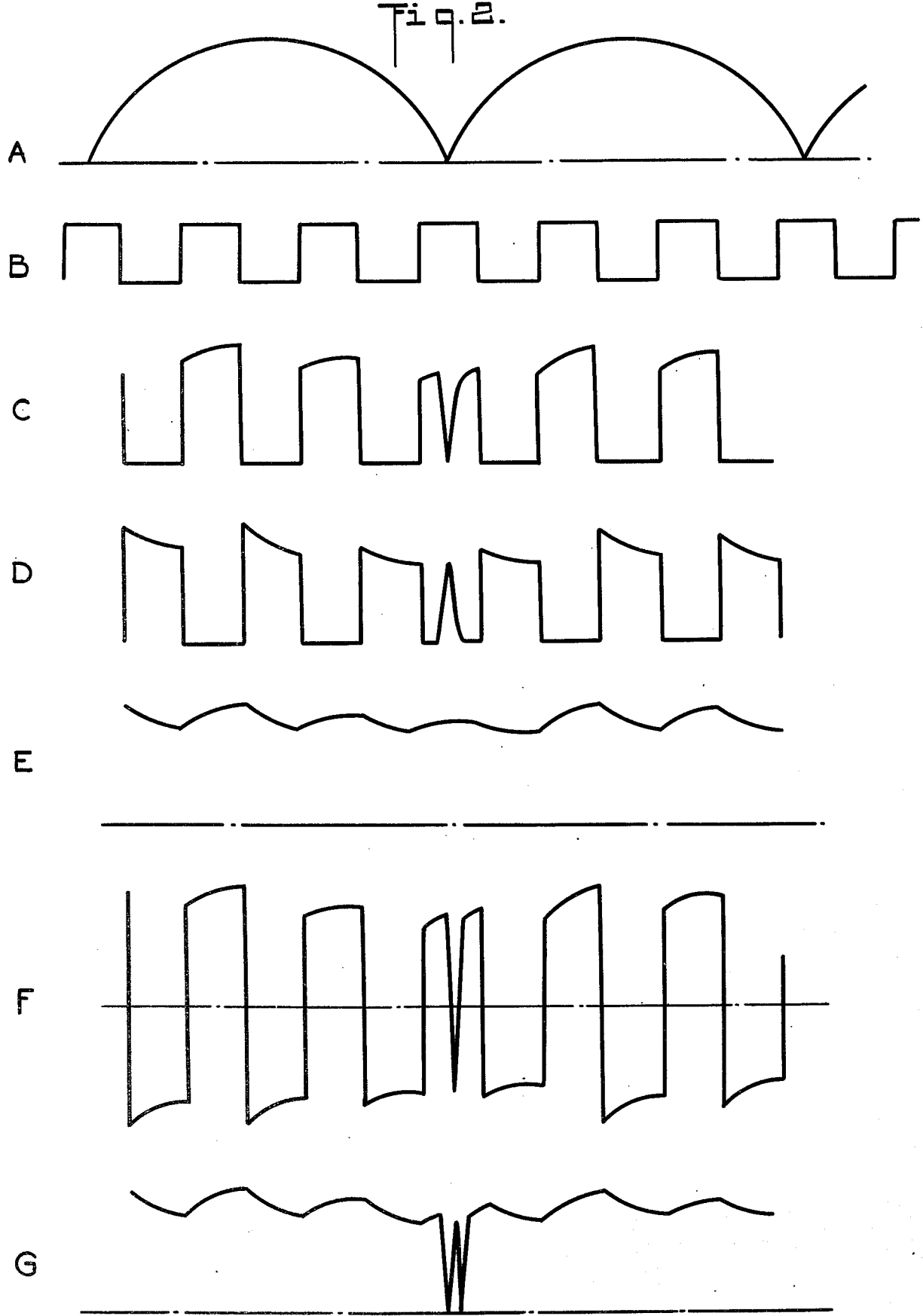

The sinusoidal a-c power supplied by the commercial power line source 14 is full-wave rectified by rectifier 13 as shown in FIG. 2A. The output of rectifier 13 is chopped by means of switch 11 which is on-off controlled, as shown in FIG. 2B.

As illustrated in FIG. 2C, the excitation current supplied to excitation coil 5 decreases temporarily in the region where the commercial electric power crosses the zero line, even though switch 11 is in its "on" state, in that the power voltage decreases less than the forward voltage of full-wave rectifier 13. On the other hand, the current resulting from the counter electromotive force, as shown in FIG. 2D, flows in the excitation coil not only when switch 11 is in its "off" state, but also when the power voltage becomes zero during the "on" state of switch 11.

More specifically, when the power voltage becomes zero while switch 11 is in its "on" state, currents flow concurrently in primary windings 8a and 8b of current transformer 8. As a result, in the secondary winding 8c of current transformer 8, there is generated a current, as shown in FIG. 2F, which current is proportional to the difference between the current flowing in winding 8a and the current flowing in winding 8b.

The output current derived from secondary winding 8c is rectified by means of rectifier 9, as a result of which one obtains a full-wave rectified reference signal, as shown by FIG. 2G. As will be evident from this figure, the reference-voltage signal decreases temporarily in the region where the commercial electric power crosses the zero line, as compared with the excitation current shown by FIG. 2E. It is this temporary decrease in the reference voltage signal that causes an error signal problem.

To overcome this drawback, one could conceivably employ an arrangement interposing a smoothing capacitor across the output of rectifier 13, so that current is supplied to excitation coil 5 from this capacitor when the power voltage decreases in the region of its zero crossover. However, this solution gives rise to another problem, in that a magnetic flowmeter requires a relatively heavy excitation current (i.e., more than a few amperes), and it is necessary, therefore, to use a large size capacitor. In practice, it is very difficult to obtain a capacitor having a large capacitance value which also has a constant characteristic.

First Embodiment

Figure 3:
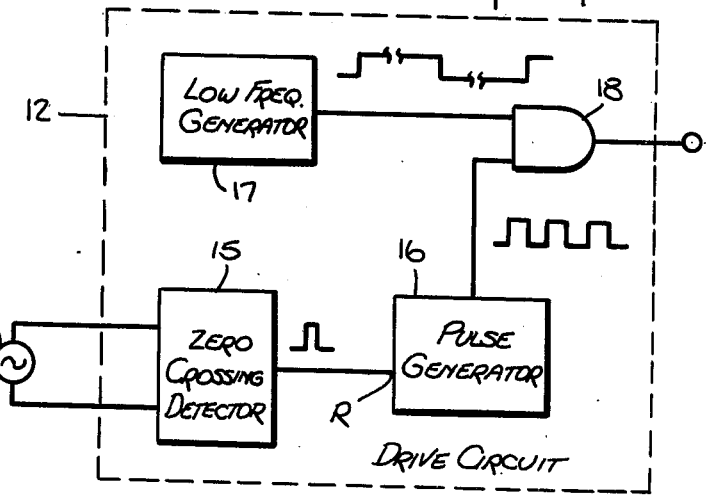
FIG. 3 is a schematic diagram of one example of the switch drive circuit to be incorporated in a first embodiment of a magnetic flowmeter in accordance with the invention.
Figure 5:
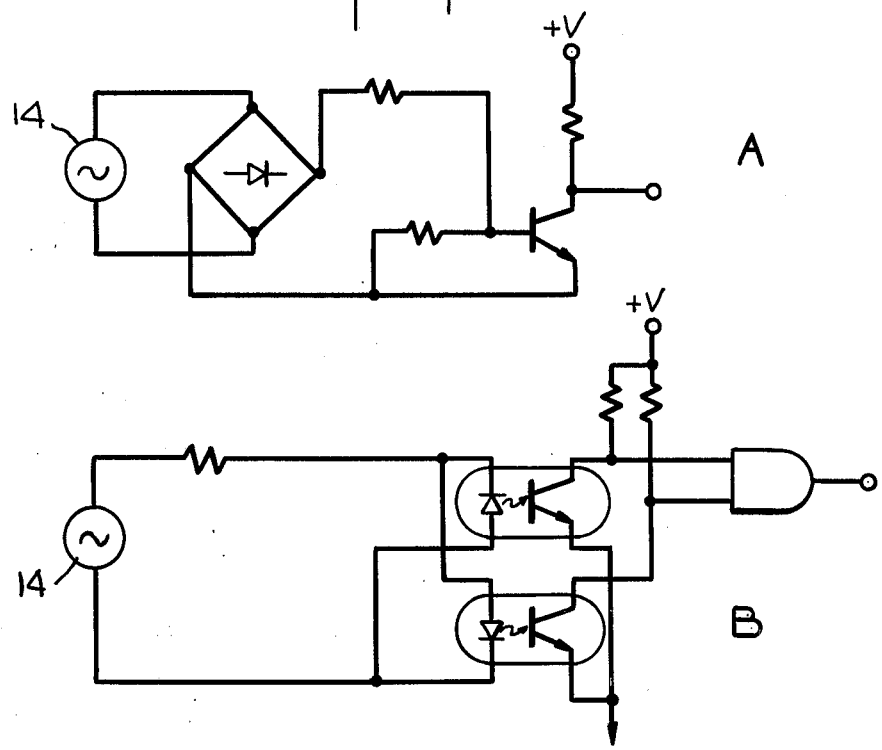
FIGS. 5A and 5B are schematic diagrams of preferred circuits for detecting the zero voltage of a commercial electric power voltage.

Referring now to FIG. 3, there is shown one example of a switch drive circuit 12 to be incorporated in a magnetic flowmeter in accordance with the invention. From commercial power source 14, a-c power is supplied to a circuit 15 functioning to detect the point where the a-c power crosses the zero line. FIGS. 5A and 5B illustrate preferred examples for crossover detection circuit 15. The output pulse of this detector is applied to the reset input terminal (R) of a pulse generator 16. An AND circuit 18 is arranged to receive both the output of a low-frequency wave generator 17 and that of pulse generator 16.

Figure 4:
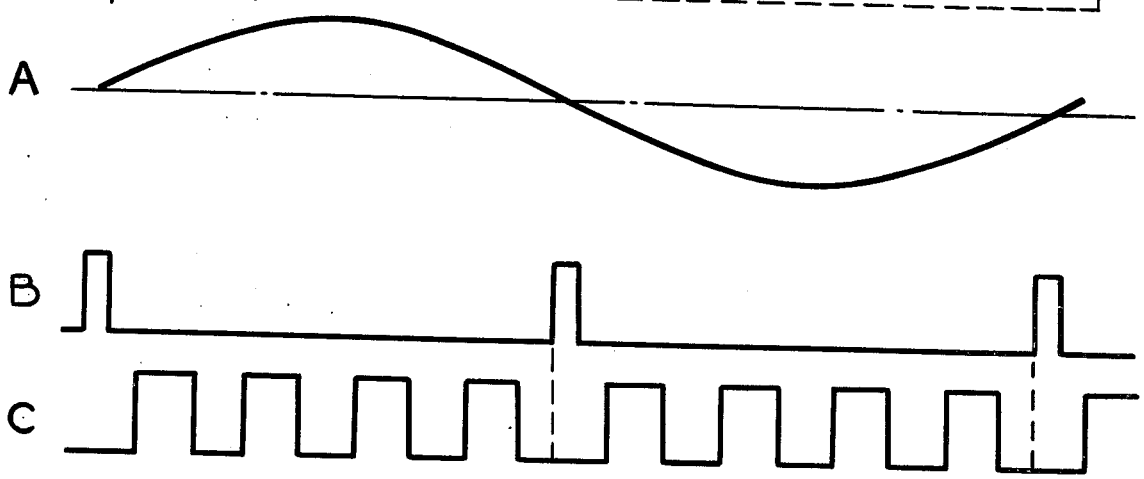
FIGS. 4A to 4C are waveforms illustrating the operation of the switch drive circuit shown in FIG. 3.

The operation of the switch drive circuit will now be explained in connection with FIGS. 4A to 4C. FIG. 4A is the waveform of the commercial power line source voltage. When the a-c power shown in FIG. 4A crosses the zero line, detector circuit 15 generates an output pulse of the type shown by FIG. 4B. The output pulse therefrom is applied to reset terminal (R) of pulse generator 16, whereby the generator is caused to generate a signal which when the a-c power crosses the zero line, renders switching element 11 "off." Low-frequency wave generator 17 yields, for example, a low-frequency rectangular wave, thereby controlling the excitation and non-excitation state of excitation coil 5.

For pulse generator 16, an IC timer may be used which includes an oscillator and a counter having a reset terminal. Further, it is desirable to design pulse generator 16 so that it generates an output pulse having 50% on-off duty cycle in the vicinity of the zero crossover of the commercial power voltage.

Although the invention has been explained mainly in connection with a d-c excitation type magnetic flowmeter or a low-frequency excitation type magnetic flowmeter whose electromagnet is energized in a manner which alternately repeats an excitation state and a non-excitation state, the invention may also be used in an excitation type magnetic flowmeter whose excitation coil is energized in a manner whereby positive excitation and negative excitation states are repeated alternately, or where a positive excitation state and a non-excitation state in which excitation current becomes zero, and a negative excitation state and non-excitation state are repeated in the above-noted order. In this case, diode 10 connected in parallel to the excitation current circuit should be replaced by a series circuit composed of a capacitor and a resistor.

Second Embodiment

Figure 6:
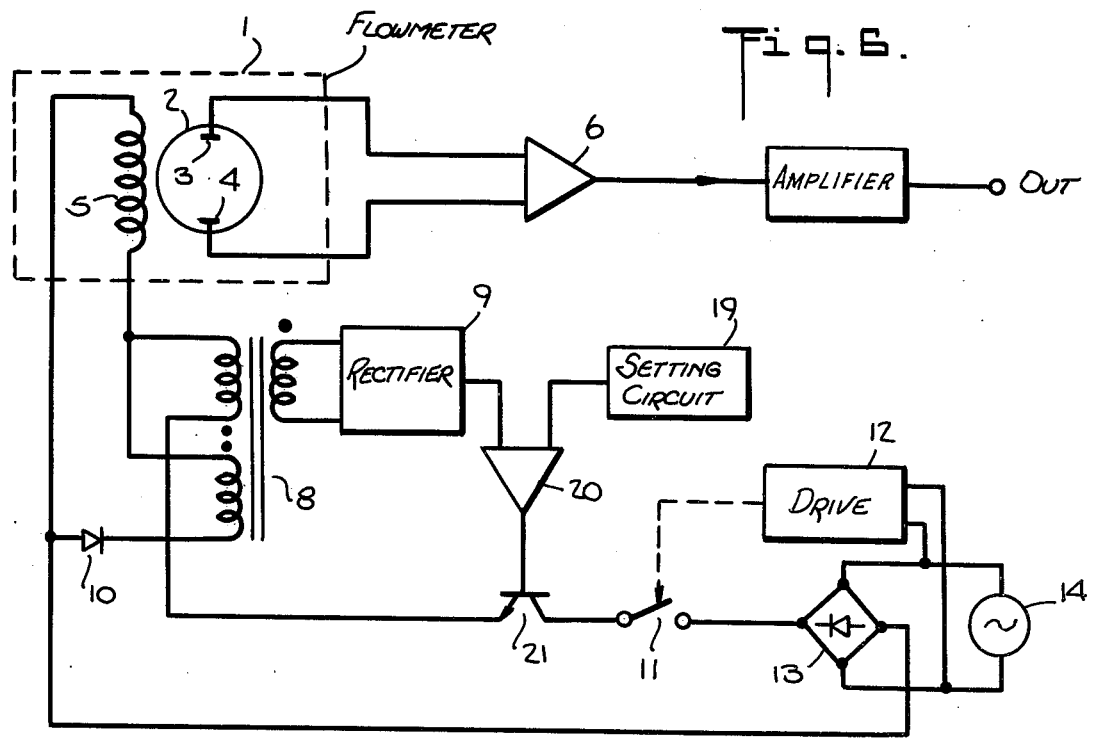
FIG. 6 is a schematic diagram of a second embodiment in accordance with this invention.

FIG. 6 shows a second embodiment of the invention. In this figure, a transistor 21 serving to control the excitation current is interposed between current transformer 8 and switching element 11. The output of a reference voltage setting circuit 19 and the reference-voltage derived from rectifier 9 are applied to the respective inputs of a comparator 20 which constitutes a transistor drive circuit.

With this arrangement, the excitation current is controlled by means of transistor 21 in accordance with the reference voltage, whereby the amplitude of the excitation current is made constant.

While there have been shown and described preferred embodiments of an improved magnetic flowmeter in accordance with the invention, it will be appreciated that many changes and modifications may be made therein without, however, departing from the essential spirit thereof.

I claim:

1. In a magnetic flowmeter provided with a flow tube through which the fluid to be metered is conducted, the tube having a pair of electrodes mounted at diametrically-opposed positions thereon and including an excitation coil to establish a magnetic field in the tube which is normal to the tube's axis and to a transverse axis passing through the electrodes, the fluid intersecting the magnetic field to induce a flow rate signal in said electrodes, said system comprising:

(A) rectification means coupled to a commercial power line source which produces sinusoidal a-c power whose wave periodically crosses a zero line, thereby generating a full-wave rectified output;

(B) a switching element interposed between said rectification means and said excitation coil; and (C) means to effect on-off control of said switching element by high-frequency pulses which are in synchronism with the commercial power line frequency but are not generated in the region in which said a-c power crosses the zero line, whereby the full-wave rectified output is fed to said excitation coil except in the interval when the a-c power crosses the zero line;

(D) means producing a reference voltage, said means including a current transformer having a pair of primary windings and a secondary winding, the first primary winding being interposed between said rectification means and said coil whereby said excitation current flows therethrough, the second primary winding being so connected whereby a current resulting from the counter electromotive force generated in said coil flows therethrough in a direction opposed to the flow of current in said first primary winding whereby a reference voltage a-c signal is yielded by said secondary winding from which said reference voltage is derived; and (E) means responsive to said reference voltage and coupled to said electrodes to produce an output signal in which the influence of fluctuations in said excitation current on said flow rate signal is eliminated.

2. The combination as set forth in claim 1, wherein said last-named means is constituted by a divider to which said flow rate signal at said reference voltage is applied.

3. The combination as set forth in claim 2, further including an amplifier interposed between said electrodes and said divider.

4. The combination as set forth in claim 1, wherein said reference voltage is derived from said secondary winding by means of a rectifier bridge whose input junctions are connected to said secondary winding and whose output junctions are connected to said divider.

5. The combination as set forth in claim 1, further including a diode interposed between the other of said primary windings and said excitation coil.

6. The combination as set forth in claim 1, wherein said means to effect on-off control includes a zero-crossing detector coupled to said power line to produce pulses at the crossings which are applied to the reset terminal of a high-frequency pulse generator.

7. The combination as set forth in claim 6, wherein the output of said high-frequency pulse generator and the output of a low-frequency generator are applied to an AND circuit to produce pulses for driving said switching element.

* * * * *